United States Patent Office.

MARIUS OTTO AND ALBERT VERLEY, OF PARIS, FRANCE.

PROCESS OF OBTAINING ETHER.

SPECIFICATION forming part of Letters Patent No. 562,193, dated June 16, 1896.

Application filed February 13, 1895. Serial No. 538,268. (Specimens.) Patented in France September 22, 1894, No. 241,586; in Belgium September 29, 1894, No. 112,046; in England September 29, 1894, No. 18,509; in Italy December 12, 1894, XXIX, 37,652, and LXXIV, 23, and in Austria January 8, 1895, No. 45/99.

*To all whom it may concern:*

Be it known that we, MARIUS OTTO and ALBERT VERLEY, citizens of the French Republic, residing at Paris, France, have invented certain new and useful Improvements in the Production of Ethers of the Alcohols Contained in Natural Essences and of their Corresponding Alcohols, (for which patents have been granted in Belgium, No. 112,046, dated September 29, 1894; in France, No. 241,586, dated September 22, 1894; in Great Britain, No. 18,509, dated September 29, 1894; in Italy, XXIX, 37,652, and LXXIV, 23, dated December 12, 1894, and in Austria, No. 45/99, dated January 8, 1895,) of which the following is a specification.

Certain natural essences, and especially that of geranium, contain quantities more or less important of an alcohol called "geraniol" and having the general formula $C_{10}H_{18}O$. This alcohol is charged with impurities, such as terpenes, camphenes and the like, from which it is very difficult to free it by ordinary methods, such as distillation or fractioning. Its acid ethers, of which we have prepared a large number, have generally a delicate and agreeable odor, and can well be employed in perfumery.

We have invented a process for preparing these ethers directly from the natural essences which contain geraniol. This process is based upon the direct transformation of the geraniol contained in the natural essences into ethers, by means of acid chlorids (or their derivatives) and sodium or other metal of the same family.
The operation is preferably conducted in presence of a neutral solvent. Taking R to designate any acid radical, the reaction may be represented by the equation:

$$C_{10}H_{18}O + RCl + Na = H + NaCl + C_{10}H_{17}OR.$$

The terpenes, camphenes and other impurities are not attacked, and can be eliminated in two ways: first, by a current of steam which carries them off, leaving the ether when it is not very volatile; or, second, by fractional distillation, which is then easy because the difference originally existing between the boiling-points of the impurities and that of geraniol is generally increased when this alcohol is transformed into ether. This ether saponified by a base in alcoholic solution regenerates the alcohol from which it was produced or an isomer. By simple rectification the alcohol can be got chemically pure. This saponification of the ether can especially be effected by heating the ether with water alone or in presence of a metallic oxid in free state or in form of carbonate, capable of combining with the acid, which is liberated by the saponification.

We shall give as examples of the application of our general process to the preparation of several ethers of the alcohol contained in essence of geranium.

I. *Butyric ether.*—Ten kilograms of absolute ether, fifteen hundred grams of geranium essence, and one thousand grams of butyric chlorid are mixed together. To the mixture are added in small doses two hundred and fifty grams of sodium. The reaction takes place without requiring heat, according to the equation:

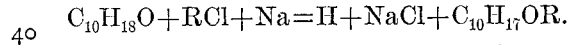

The product, which has the formula

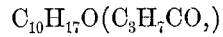

is washed with water and carbonate of soda, the upper layer is decanted, the ethylic ether is evaporated on the water-bath, and the residue is fractioned under vacuum.

The butyric ether is a colorless liquid boiling at 145° to 146° centigrade under a pressure of nineteen millimeters. Its density at 0° centigrade is 0.913.

By heating one thousand grams of this butyric ether with thirty thousand grams of water and two thousand grams of carbonate of calcium, kept some days in a closed vessel combined with a reflux cooler, the alcohol, (geraniol,) from which the ether was produced, is partially regenerated, so that a mixture of geraniol and of its butyric ether is obtained, which constitutes a new perfume.

II. *Valeric ether.*—The preparation is the same as above, employing valeric chlorid instead of butyric chlorid. The product is a colorless somewhat oily liquid boiling at 152° to 153° centigrade under a pressure of nineteen millimeters. Its density at 0° centigrade is 0.9098.

III. *Benzoic ether.*—The preparation is the same as before, using benzoic chlorid. Instead of rectifying, the product is cleared of impurities fractionally by steam. The benzoic ether, which is only slightly volatile, remains in the last portions. It is a viscid liquid slightly colored greenish-yellow. It boils at 189° to 190° centigrade under a pressure of fourteen millimeters. Its density at 0° centigrade is 0.988.

Having thus described our invention, we claim—

1. The manufacture of acid ethers of geraniol by heating the natural essences which contain this alcohol with the chlorids of organic acids, as for instance butyric chlorid, and an alkaline metal, as for instance sodium, in presence of a neutral solvent and finally separating the ether formed from the impurities by distillation, as described.

2. The herein-described method of transforming the acid ethers of geraniol into new perfumes, which consists in partially saponifying the ether by heating it in an aqueous solution of calcium carbonate for some days in a closed vessel, substantially as set forth.

3. As a new article of manufacture, applicable in perfumery, the described butyric ether of the alcohol contained in geranium essence, constituting a colorless liquid having a delicate and agreeable odor, boiling at 145° to 146° centigrade under a pressure of nineteen millimeters and having a density of 0.913 at 0° centigrade.

In witness whereof we have hereunto signed our names in the presence of two subscribing witnesses.

MARIUS OTTO.
ALBERT VERLEY.

Witnesses:
   CLYDE SHROPSHIRE,
   D. T. S. FULLER.